Nov. 17, 1970   N. G. ZIEGLER ET AL   3,540,273
STRAIN GAGE BALANCE

Filed Sept. 23, 1968   2 Sheets-Sheet 1

INVENTORS
NORMAN G. ZIEGLER
CLAIR J. MARTIN

BY
AGENT

ATTORNEY

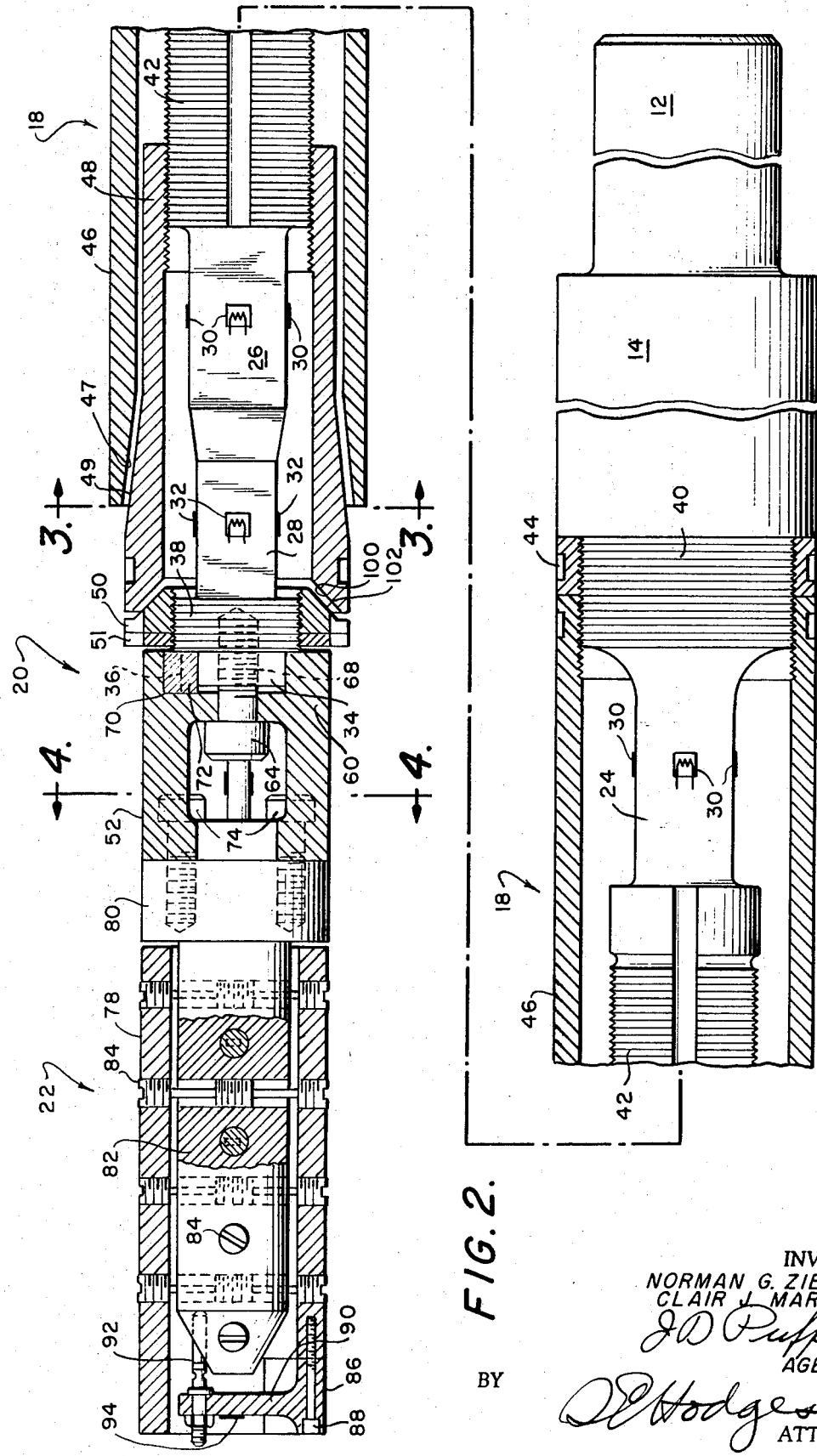

United States Patent Office

3,540,273
Patented Nov. 17, 1970

---

3,540,273
STRAIN GAGE BALANCE
Norman G. Ziegler, 11518 Gainesborough Road, Rockville, Md. 20854, and Clair J. Martin, 3740 Holmes Lane, Alexandria, Va. 23202
Continuation-in-part of application Ser. No. 596,013, Nov. 21, 1966. This application Sept. 23, 1968, Ser. No. 761,452
Int. Cl. G01m 9/00
U.S. Cl. 73—147              9 Claims

---

ABSTRACT OF THE DISCLOSURE

A strain gage balance for supporting an aerodynamic model in a wnid tunnel in which the gaged beam portions of the balance are protected from excessive loading by enclosing the beams in an open ended cylinder in which the beam may freely deflect within the clearance provided between the outside surface of the beam and the internal surface of the cylinder. The gap between the beam and the cylinder is adjustable according to the design limits of the beam. The invention also provides an axial force measuring unit in which the model is attached to an outer cylinder which is connected to an inner concentric cylinder by a plurality of spoke-like members arranged to provide the axial force measuring unit with high sensitivity to axial forces and a high resistance to all other forces and moments acting on the model.

---

The invention described herein may be manufactured and used by or for the Government of the United States of America for governmental purposes without the payment of any royalties thereon or therefor.

This is a continuation in part of U.S. patent application Ser. No. 596,013 filed Nov. 21, 1966, now abandoned.

BACKGROUND OF THE INVENTION

This invention relates to a strain gage balance of the type used in wind tunnel evaluation of aerodynamic shapes on which a model of the test shape is mounted and the cantilever mounted beam is instrumented so as to measure forces and moments acting upon the model.

In particular, the invention relates to a strain gage balance having measurement sections for use in supersonic wind tunnels in which there is provided protection for the measurement sections of the balance against excessive and turbulent loads encountered during the stopping and starting of flow in the tunnel.

When testing models in a supersonic tunnel it is desirable to be able to measure extremely small variations in forces and moments acting upon the model during a steady state condition of flow in the tunnel. However, during the starting of flow in the supersonic wind tunnel there is a transition period in which the flow in the test section changes from subsonic to supersonic. This transition is characterized by the passage through the test section of a series of normal or oblique shocks which occur just prior to the beginning of supersonic flow. Thus the balance must be able to withstand these transient loads which may be from 5 to 10 times the maximum steady state load to be measured. If the balance is made sufficiently strong to withstand these transient loadings there is of course a loss of sensitivity to small changes occurring during the steady state condition of flow. It is the small changes during the steady state condition which are of interest to those conducting the test.

The invention described herein provides a balance which is extremely sensitive to small changes in forces and moments acting upon the model and additionally the gaged sections of the balance are protected against damage from overload during transient flow conditions.

The gaged sections are protected by means of a protective device composed of at least one cylinder concentric with the sections and which encloses the gaged sections but allows a predetermined amount of bending in the sections before the balance contacts the protective device. When the predetermined amount of deflection is reached the balance contacts the protective device which increases the modulus of the beam making it stiffer and thus able to withstand considerably higher forces and moments than the gage section can withstand alone. In addition, enclosing the gage sections within a concentric cylinder forms the windshield for the gage sections and prevents erroneous readings which may occur from air flowing in the tunnel acting directly upon the gages.

The invention further provides a novel structure for measuring axial forces acting upon the balance which is simple in construction and is structurally stiff about all three axes but is compliant in response to force applied in the axial direction. Further, the gaging section on which the axial force is measured has a separable gaged beam which may be easily replaced thus allowing selection of a stiffer or more compliant beam as the test requires.

SUMMARY OF THE INVENTION

The invention described herein provides the strain gage balance in which the gaged beam portions of the balance subject to bending by forces and moments acting upon the balance, are protected against excessive bending when the balance is subjected to loads in excess of the design loads. The gaged beam portions are free to deflect within a predetermined limit but when the predetermined limits are exceeded protective devices engage the gage beam portions and provide the balance with an increased section modulus making the balance capable of withstanding loads several times the design load of the gaged beam sections. Thus the gaged beam sections may be made sensitive to small changes in loading under steady state conditions but will not be damaged under high transient loading. These protective devices are arranged so that the gage beam portions are protected from outside forces acting directly upon these sections as well as bending forces occurring as a result of forces applied to the balance at a point remote from the gaged beam sections.

There is further provided herein a structure for measuring axial forces acting upon the strain gage balance which has high mechanical resistance to transverse forces and rotary moments but which is compliant when subjected to axial forces. In addition there is provided a gaged beam for measuring axial forces which may be easily replaced with stiffer or more compliant beams depending upon the magnitude of the forces to be measured.

It is therefore an object of this invention to provide a strain gage balance in which the gaged beam portions subject to bending are protected against loads in excess of the design limits.

It is a further object of this invention to provide a strain gage balance in which the gaged beam bending portions are protected against forces acting directly upon the gaged portions.

It is yet a further object of this invention to provide in a strain gage balance a means for increasing the section modulus of the gaged beam bending portions of the balance when predetermined bending loads are exceeded.

It is still another object of this invention to provide a protective device for the gaged beam portion of the strain gage balance in which the section modulus of the balance is progressively increased when the loads on the balance exceed a predetermined limit.

It is yet another object of this invention to provide a strain gage balance in which the axial force measuring section resists deflection due to transverse loads and moments yet is sensitive to small axial forces.

It is another object of this invention to provide a strain gage balance in which the axial force measurement section is provided with a replaceable gaged beam portion whose stiffness may be selected according to the forces expected to be encountered.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 2 is a view in cross section of the strain gage balance according to the invention;

DESCRIPTION AND OPERATION OF THE PREFERRED EMBODIMENT

Figure 1:
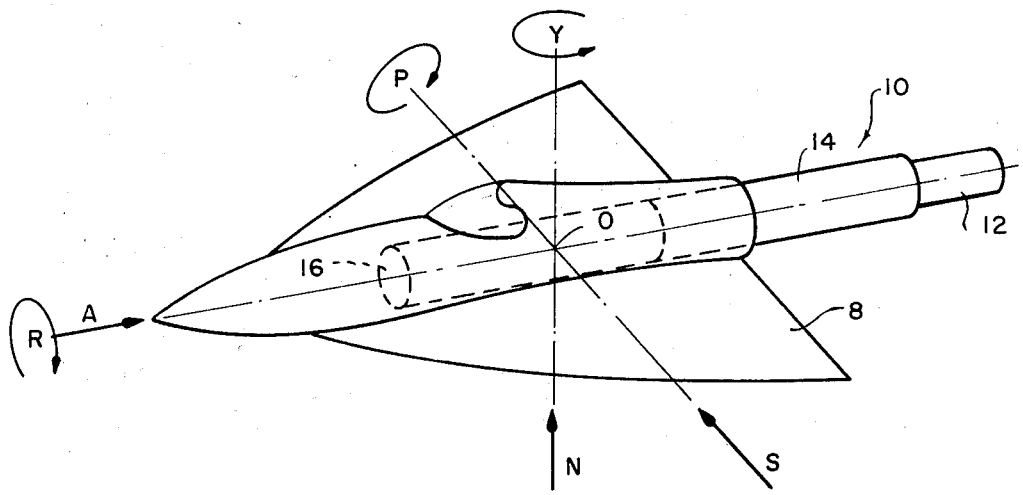
FIG. 1 is a schematic representation of an aerodynamic model mounted on the strain gage balance and indicating the axes about which forces and moments are to be measured.
Figure 3:
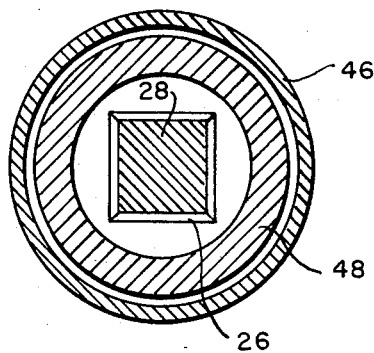
FIG. 3 is a view in transverse cross section taken along line 3—3 of FIG. 2.

Referring now to FIG. 1 there is shown a strain gage balance 10, of the type described which is composed of a support section 12, the body section 14 and a measurement portion 16. Attached to the strain gage balance on the measurement portion thereof is an aerodynamic model 8. The strain gage balance 10 is instrumented to measure forces and moments acting upon the model about three principal orthogonal axes. The roll axis is a longitudinal horizontal axis which extends through the model about which the roll moment, designated R, is measured. The axial force, designated A, is measured along this axis. The pitch axis is a transverse horizontal axis about which pitch moments, designated P are measured and side forces designated S. The yaw moment Y and the normal forces N are measured about a vertical or yaw axis. The three axes which are mutually perpendicular intersect at a common point designated O.

Referring now to FIG. 2 there is shown a longitudinal cross section through the strain gage balance 10. There is shown at one end a support section 12 by which the balance is mounted in a cantilever fashion within the wind tunnel or other test area. Forward of the support section there is a body section 14 upon which is attached the measurement section 16. Immediately forward of the body section 14 is a gaged beam section 18 on which there are provided three beam sections of predetermined precise cross sectional areas and designated 24, 26, and 28. Sections 24 and 26 are identical in size and shape and each is provided with a plurality of strain measuring gages 30 attached to the beam in a conventional manner.

To provide an operational output, the gages on these beam sections which measure bending stresses in the beam are connected such that their outputs are proportional to the normal and side forces acting upon the model. Immediately forward of section 26 is a second beam of square cross section but smaller dimensions than sections 24 and 26, and provided with strain gages 32 similar to gages 30 on sections 24 and 26 and which are connected such that their output is proportional to the pitch and yaw moments exerted upon the model.

Immediately forward of the pitch and yaw moment section there is provided a threaded section 38 and a spindle portion 34 having a keyway 36 in the upper surface thereof.

In the embodiment shown, the support section 12, the body section 14 and the beam section 18 are formed in a single unitary piece. There are further provided on this unitary member two additional threaded portions designated 40 and 42. Attached to the body section 14 at the threaded portion 40 there is a collar member 44 and an outer protective sleeve 46. Attached at the threaded portion 42 there is provided another protective sleeve 48 which is concentric with sleeve 46 and extending into sleeve 46 for a portion of its length. Attached to the threaded portion 38 is a second collar member 50. The function of the protective members and their associated collars will be described below.

Figure 4:
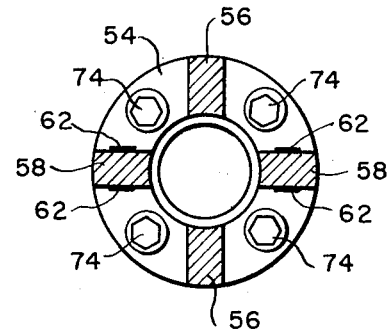
FIG. 4 is a view in transverse cross section taken along line 4—4 of FIG. 2.

Immediately forward of the gaged beam section there is provided the roll measurement section 20 which is comprised of a roll cage 52 having two pairs of web members designated 56 and 58 placed at right angles to each other and equally spaced about the longitudinal axis. At each end of the roll cage there is provided a flange member. The forward flange 54 shown in FIG. 4. In providing an operational output, it is preferred that at least two of the web members are provided with strain gages 62 which are electrically connected in any suitable well known manner such that their output is proportional to the rolling moment exerted on the model about the longitudinal axis. The roll cage is attached to the gaged beam portion by means of a bolt 64 by means of a threaded hole 68 in the end of the spindle member 34. The roll cage is also provided with a keyway 70 which is placed in register with the keyway in the spindle member and into which is inserted a key member 72 which prevents rotation of the roll cage about the longitudinal axis with respect to the gaged beam portion.

Attached to the forward end of the roll cage by means of bolts 74 is an axial force measurement section 22. The axial force section is provided with a body member 80 by which it is attached to the roll cage and a cylindrical member 82. A second cylinder 78 surrounds cylinder 82 and is attached to the first cylinder by means of spoke members 84. The spoke members are arranged in two orthogonal rows and are attached to the cylinders by means of threaded portions at each end threaded into the outer cylinder 78 at a center threaded portion attached to the inner cylinder 82. The spoke members are generally rectangular in cross section except for the threaded portions and are arranged such that their long surface lies in a plane perpendicular to the roll axis of the balance.

Attached to the bottom portion of the outer cylinder 78 is an axial force beam 86 which is attached to cylinder 78 by means of screws 88. An axial force beam arm 90 is attached to the inner cylinder 82 by means of a flexure 92. The arrangement of the spoke members provides in operation the axial force unit with a high degree of resistance to moments acting on the model as well as normal and side forces. However when the outer cylinder 78 is subjected to axial forces, bending occurs in the spoke members and in the axial force beam causing an output from strain gage 94 which is proportional to the axial force applied.

Referring again to FIG. 2, there are shown two protective sleeves or fouling devices 46 and 48 which protect the gaged beam sections 24, 26 and 28 from being overstressed beyond their design limits. The inner-sleeve 48 is of cylindrical form and is attached to the beam portion of the balance by means of threads 42 provided on the beam portion between the two normal and side force sections 24 and 26.

The sleeve 48 extends from the threaded portion 42 forward to the end of the gage beam portion 28. The sleeve has an inside diameter large enough to provide substantial clearance around the beams to permit beam flexure. The open end of the sleeve 48 terminates in a beveled surface 100. At the forward end of the gage beam section 28 there is provided an adjustable collar member 50 having a conical surface 102 with the same slope as surface 100 on sleeve 48. Immediately forward of the collar 50 there is provided a locking collar 51 by which the collar 50 is secured in place. The first collar 50 is adjusted to provide a predetermined gap between the beveled surface of the sleeve and the conical surface of the collar.

The first collar is then locked in place by tightening the second collar against the first collar.

The gap provided between the collar and the sleeve allows the beam portion of the balance to flex freely within the limits on the gap. If the load of the beam causes flexure in excess of that allowed by the preset gap, the collar surface contacts a mating surface in the sleeve opening and prevents further flexure of the gaged beam. When the sleeve contacts the collar the section modulus of the assembly is substantially increased and the deflection of the balance per unit load of force applied to the balance by the forces acting on the model is greatly reduced and excessive flexure of the gaged beam is prevented.

Behind the sleeve 48 is a second protective cylinder or fouling device 46 which is attached to the body of the balance at the threaded portion 40 and is concentric with the first sleeve and extends for a substantial length along the first sleeve. The second sleeve has a beveled surface 47 at its open end similar to surface 100 described in connection with the first sleeve. On the external surface of the first sleeve 48 at a point within the second sleeve 46 there is provided a conical surface 49 corresponding to the conical surface of the collar 50. The gap between the surface 47 of the sleeve 46 and surface 49 of the sleeve 48 is adjustable by rotating sleeve 46 on threads 40 and advancing or retracting sleeve 46 with respect to sleeve 48. When the gap has been set to a predetermined amount locking collar 44 is tightened against the rear face of sleeve 46 to lock it in place.

The second protective sleeve 46 operates in the same manner as described above in connection with sleeve 48. When the sleeve 48 has deflected so as to close the gap between sleeve 48 and sleeve 46 further bending of sleeve 48 is restrained and the section modulus of the strain gage balance assembly is further increased so as to substantially reduce the deflection of the gaged beam portion of the balance.

Thus it can be seen that there is provided according to the invention a strain gage balance in which the gaged beam portions may be made sensitive to small changes in the applied force and yet are protected from damage during transient overload conditions which might otherwise damage the gaged beam sections. The protective device may be adjusted according to the desired predetermined maximum loads for the beam. Additionally, a second protective device can be arranged in series with the first device for restricting bending at a second predetermined load.

In addition, the invention described herein provides a unique axial force measurement section which is simple and inexpensive and further provides for selection of the stiffness of its gaged beam portion according to the loads anticipated in the test.

It is to be understood that the invention is not limited to the exact details of construction shown and described for obvious modifications will occur to persons skilled in the art.

What is claimed is:

1. A strain gage balance for measuring forces acting upon a model in a test environment, said balance comprising:
   a body section;
   a support section formed at one end of said body section for supporting said balance in the test environment;
   at least one freely deflectable beam section fixedly attached at one end to the other end of said body section and having a model operatively connected to the other movable end thereof, said beam section being provided with gages for measuring forces acting upon said model; and
   means attached to said beam section for limiting free deflection of said beam section within predetermined limits thereby preventing damage to said beam section when said model is subjected to forces in excess of the design limits of said beam section.

2. A strain gage balance according to claim 1 wherein the means for limiting the free deflection of said beam section comprises:
   a sleeve open at one end and mounted at the other end on said beam section, said sleeve enclosing said beam section and spaced apart therefrom; and
   a collar attached to said beam section at an end of said beam section remote from said body section and extending partially into the open end of said sleeve and spaced apart from an internal surface of said sleeve by a predetermined amount, said predetermined amount defining the free deflection limits of said beam section.

3. The strain gage balance according to claim 2 wherein the open end of said sleeve includes a bevel at the internal edge thereof, thereby forming a sloping face on the internal surface of said sleeve and said collar is of conical shape, having the same slope as the sloping face of said sleeve opening whereby the spaced apart relationship of said sleeve and said collar is varied according to the length of said collar extending into said sleeve.

4. A strain gage balance according to claim 3 and further comprising:
   a second sleeve attached to said body section between said first sleeve and said support section, said second sleeve being of larger diameter than said first sleeve and concentric therewith, said second sleeve further having an internal beveled face at the open end thereof and the first sleeve having a conical face on the outer surface thereof at a point adjacent the beveled face of the open end of said second sleeve.

5. A strain gage cantilever balance for measuring forces acting on a test specimen along and about three principal axes, said strain gage balance comprising:
   a body section;
   a support section formed on one end of said body section for supporting said body section in a cantilever manner;
   a beam section formed on the other end of said body section and being free to deflect under forces applied to the end opposite said body section;
   a moment section attached at one end to the free end of said beam section for measuring moments applied about the horizontal longitudinal axis of the balance;
   an axial force section attached to the other end of said moment section for measuring forces applied along the horizontal longitudinal axis of the balance; and
   means attached to said beam section for limiting free deflection of said beam section within predetermined limits thereby preventing damage to said beam section when said balance is subjected to forces in excess of the design limits of said beam section.

6. A strain gage cantilever balance according to claim 5 wherein the means for limiting the free deflection of said beam section comprises:
   a sleeve open at one end and mounted at its other end on said beam section, said sleeve enclosing said beam and spaced apart therefrom; and
   a collar attached to said beam section at an end of said beam section remote from said body section and extending partially into the open end of said sleeve by a predetermined amount, said predetermined amount defining the free deflection limits of said beam section.

7. A strain gage cantilever balance according to claim 6 wherein the open end of said sleeve includes a bevel at the internal edge thereof, thereby forming a sloping face on the internal surface of said sleeve and said collar is of a conical shape having the same slope as the sloping face of said sleeve opening whereby the spaced apart relationship of said sleeve and said collar is varied according to the length of said collar extending into said sleeve.

8. A strain gage cantilever balance according to claim 7 and further comprising:
  a second sleeve attached to said body section between said first sleeve and said support section, said second sleeve having larger diameter than said first sleeve and being concentric therewith, said second sleeve further having an internal beveled face at the open end thereof and the first sleeve having a conical face on an outer surface thereof at a point adjacent said beveled face of the open end of said second sleeve.

9. A strain gage cantilever balance according to claim 5 wherein said axial force section comprises:
  a first cylindrical member, having a circular cross section and having a plurality of holes extending transversely through said member and arranged in two orthogonal rows;
  a second cylindrical member concentric with and encircling said first member and having a plurality of holes extending transversely through the walls of said second member and arranged in two orthogonal rows in a pattern identical with the holes in said first member;
  spoke means attached to said second member and said first member, said spokes being fastened at each end in opposite holes in said second member and at the center in a corresponding hole in said first member; and
  a beam member attached at one end to said first member and at the other end to said second member and having gages attached thereto for measuring the force applied to said second member with respect to said first member along a horizontal longitudinal axis.

References Cited
UNITED STATES PATENTS

| | | | |
|---|---|---|---|
| 2,505,070 | 4/1950 | Shaw | 73—133 |
| 3,019,643 | 2/1962 | Curry | 73—147 |
| 3,309,921 | 3/1967 | Eckard | 73—141 |
| 3,320,569 | 5/1967 | Jones | 73—141 |

LOUIS R. PRINCE, Primary Examiner

D. E. CORR, Assistant Examiner

U.S. Cl. X.R.

73—141